US012643443B2

(12) United States Patent
Kim et al.

(10) Patent No.: US 12,643,443 B2
(45) Date of Patent: Jun. 2, 2026

(54) VEHICLE SEAT

(71) Applicants: Hyundai Motor Company, Seoul (KR); Kia Corporation, Seoul (KR); Hyundai Transys Inc., Seosan (KR)

(72) Inventors: Eun Sue Kim, Hwaseong (KR); Dae Hee Lee, Incheon (KR); Sang Hark Lee, Incheon (KR); Ji Yun Ha, Suwon (KR); Jun Hyung Kwon, Hwaseong (KR); Duk Kyu Byun, Gunpo (KR); Sin Jeong Kang, Hwaseong (KR); Seong Bin Jeong, Yongin (KR)

(73) Assignees: Hyundai Motor Company, Seoul (KR); Kia Corporation, Seoul (KR); Hyundai Transys Inc., Seosan (KR)

( * ) Notice: Subject to any disclaimer, the term of this patent is extended or adjusted under 35 U.S.C. 154(b) by 109 days.

(21) Appl. No.: 18/733,483

(22) Filed: Jun. 4, 2024

(65) Prior Publication Data

US 2025/0269773 A1     Aug. 28, 2025

(30) Foreign Application Priority Data

Feb. 23, 2024     (KR) ........................ 10-2024-0026757

(51) Int. Cl.
*B60N 2/30*     (2006.01)
(52) U.S. Cl.
CPC ......... *B60N 2/3047* (2013.01); *B60N 2/3038* (2013.01); *B60N 2/304* (2013.01); *B60N 2/3043* (2013.01); *B60N 2/309* (2013.01)

(58) Field of Classification Search
CPC .... B60N 2/3038; B60N 2/304; B60N 2/3043; B60N 2/3047; B60N 2/309
See application file for complete search history.

(56) References Cited

U.S. PATENT DOCUMENTS

| | | | | |
|---|---|---|---|---|
| 5,156,437 A | * | 10/1992 | Hayakawa | B60N 2/0715 |
| | | | | 297/335 |
| 5,156,438 A | * | 10/1992 | Hayakawa | B60N 2/0715 |
| | | | | 297/335 |
| 5,158,338 A | * | 10/1992 | Hayakawa | B60N 2/366 |
| | | | | 297/335 |
| 5,195,802 A | * | 3/1993 | Hayakawa | B60N 2/366 |
| | | | | 297/334 X |
| 5,320,411 A | * | 6/1994 | Sera | A47C 11/005 |
| | | | | 297/331 |

(Continued)

FOREIGN PATENT DOCUMENTS

| | | | | | |
|---|---|---|---|---|---|
| KR | 2018060397 A | * | 6/2018 | | B60N 2/3043 |
| KR | 20250130113 A | * | 9/2025 | | B60N 2/919 |

*Primary Examiner* — Rodney B White
(74) *Attorney, Agent, or Firm* — Fox Rothschild LLP

(57) ABSTRACT

Disclosed is a vehicle seat including a cushion frame having a seat cushion and having a guide groove formed in an end thereof, the guide groove being indented and formed to extend in a longitudinal direction of the cushion frame, a seat frame coupled to the cushion frame through a hinge method so as to allow the cushion frame to be rotatable, and a support link having one end coupled to the seat frame through a hinge method so as to be rotatable and the other end coupled to the guide groove formed in the cushion frame, wherein the other end is movable in the guide groove when the one end is rotated.

19 Claims, 10 Drawing Sheets

(56) References Cited

U.S. PATENT DOCUMENTS

| | | | | |
|---|---|---|---|---|
| 5,498,052 | A * | 3/1996 | Severini | B60N 2/20 |
| | | | | 297/14 |
| 6,012,771 | A * | 1/2000 | Shea | B60N 2/36 |
| | | | | 296/68.1 |
| 6,158,799 | A * | 12/2000 | Guilford | B60N 2/10 |
| | | | | 296/65.09 |
| 6,655,738 | B2 * | 12/2003 | Kammerer | B60N 2/0292 |
| | | | | 297/331 X |
| 6,817,646 | B2 * | 11/2004 | Kikuchi | B60N 2/06 |
| | | | | 296/65.09 |
| 6,883,854 | B2 * | 4/2005 | Daniel | B60N 2/3031 |
| | | | | 297/334 X |
| 6,883,868 | B2 * | 4/2005 | Yoshida | B60N 2/3047 |
| | | | | 297/331 |
| 7,270,371 | B2 * | 9/2007 | Adragna | B60N 2/3093 |
| | | | | 297/331 X |
| 7,374,242 | B2 * | 5/2008 | Champ | B60N 2/305 |
| | | | | 297/331 |
| 7,559,594 | B2 * | 7/2009 | McMillen | B60N 2/832 |
| | | | | 297/14 |
| 7,568,764 | B2 * | 8/2009 | Harper | B60N 2/3011 |
| | | | | 297/331 X |
| 7,611,200 | B2 * | 11/2009 | Jovicevic | B60N 2/305 |
| | | | | 297/331 X |
| 7,992,913 | B2 * | 8/2011 | Zelmanov | B60N 2/206 |
| | | | | 296/65.05 |
| 8,376,442 | B1 * | 2/2013 | Brantley | B60N 2/24 |
| | | | | 297/337 X |
| 8,646,840 | B2 * | 2/2014 | Stojanovic | B60N 2/12 |
| | | | | 297/331 X |
| 8,851,549 | B2 * | 10/2014 | Holzhueter | B60N 2/3011 |
| | | | | 296/65.09 |
| 8,882,197 | B2 * | 11/2014 | Line | B60N 2/3031 |
| | | | | 297/331 |
| 9,283,873 | B2 * | 3/2016 | Line | B60N 2/3065 |
| 9,308,836 | B2 * | 4/2016 | Hausler | B60N 2/3031 |
| 9,573,490 | B1 * | 2/2017 | Poniatowski | B60N 2/3031 |
| 9,616,778 | B1 * | 4/2017 | Bates | B60N 2/3013 |
| 9,725,018 | B2 * | 8/2017 | Sonoda | B60N 2/3025 |
| 9,919,626 | B2 * | 3/2018 | Goodhall | B60N 2/233 |
| 10,065,536 | B2 * | 9/2018 | Poniatowski | B60N 2/2209 |
| 10,336,220 | B2 * | 7/2019 | Sera | B60N 2/995 |
| 10,391,914 | B2 * | 8/2019 | Caye | B60N 2/3011 |
| 10,836,279 | B2 * | 11/2020 | Aktas | B60N 2/146 |
| 11,292,367 | B2 * | 4/2022 | Aktas | B60N 2/3022 |
| 11,890,975 | B2 * | 2/2024 | Shin | B60N 2/3011 |
| 12,103,444 | B2 * | 10/2024 | Gam | B60N 2/2209 |
| 12,128,798 | B2 * | 10/2024 | Yun | B60N 2/3031 |
| 12,304,363 | B2 * | 5/2025 | Lim | B60N 2/20 |
| 2010/0270839 | A1 | 10/2010 | Moegling et al. | |
| 2018/0244176 | A1 | 8/2018 | Matsui | |

* cited by examiner

VEHICLE SEAT

CROSS-REFERENCE TO THE RELATED APPLICATION

This application claims under 35 U.S.C. § 119(a) the benefit of Korean Patent Application No. 10-2024-0026757, filed on Feb. 23, 2024, in the Korean Intellectual Property Office, the disclosure of which is incorporated herein by reference in its entirety.

BACKGROUND

Technical Field

The present disclosure relates to a vehicle seat on which a passenger in a vehicle sits.

Background

A vehicle is equipped with a seat designed for passenger use. Recently, there has been active research and development focused on autonomous vehicles and purpose-built vehicles (PBVs). As a result, the space within these vehicles can be utilized more effectively, allowing for various functional adaptations.

A seat is freely movable and rotatable in the vehicle, allowing for efficient space utilization when not in use. For example, a tip-up seat that is not occupied by a passenger can be folded up stored in this compact, folded state within the vehicle.

Although various tip-up seat structures are known, there is a need to develop a vehicle seat capable of effectively utilizing space in the vehicle when the seat is tipped up.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a vehicle seat capable of effectively securing interior space in a vehicle when the seat is tipped up.

In accordance with the present disclosure, in one aspect a vehicle seat is provided comprising 1) a cushion frame comprising a guide groove formed in an end thereof and extended in a longitudinal direction of the cushion frame; 2) a seat frame hinged to the cushion frame, allowing the cushion frame to rotate; and 3) a support link comprising one end coupled to the seat frame to enable rotation, and the other end coupled to the guide groove in the cushion frame, allowing movement within the guide groove when the one end rotates.

In certain preferred embodiments, the support link is coupled with a hinge element to the seat frame.

In a further aspect, a vehicle seat is provided comprising a guide groove formed in an end thereof, and extended in a longitudinal direction of the cushion frame, a seat frame hinged to the cushion frame, allowing the cushion frame to rotate, and a support link comprising one end hinged to the seat frame to enable rotation, and the other end coupled to the guide groove in the cushion frame, allowing movement within the guide groove when the one end rotates.

When the cushion frame or support link is rotated towards the seat frame, the support link may be accommodated on the inner side of the cushion frame.

The support link may extend in a longitudinal direction thereof and may include a bent point.

The cushion frame may be hinged to a first coupling portion of the seat frame, the support link may be hinged to a second coupling portion of the seat frame, and the first coupling portion may be located higher than the second coupling portion.

The cushion frame and the seat frame may be coupled to each other through a first hinge pipe, and the support link and the seat frame may be coupled to each other through a second hinge pipe.

The first hinge pipe and the second hinge pipe may be fixedly connected to one end of the cushion frame and one end of the support link, respectively, and may be rotatably connected thereto in the seat frame.

The cushion frame may have a pair of the opposite ends each having the guide groove formed therein, and a pair of the support links facing each other may be provided so as to allow the other end of each support link to be coupled to the guide groove.

The cushion frame may have a pair of the opposite ends each having the guide groove formed therein, each guide groove may have a support pipe movably coupled thereto and formed to extend in a width direction of the cushion frame, and a pair of the support links facing each other may be provided so as to allow the other end of each support link to be coupled to the support pipe.

The support pipe may move within the guide groove in response to the rotation of the cushion frame.

The cushion frame may have a locking lever provided on an inner side thereof that engages with and is coupled to the support pipe so as to prevent movement of the support pipe.

The locking lever may have a handle portion provided at one end thereof, the handle portion being formed to protrude outwards from the cushion frame so as to apply external force thereto, and a locking hook provided at the other end thereof that engages with and is coupled to the support pipe so as to prevent the movement of the support pipe.

Coupling between the locking hook and the support pipe may be released when the external force is applied to the handle portion, thereby allowing the support pipe to be movable.

The locking hook may have an inclined surface formed at an end thereof, and when the cushion frame is rotated, the support pipe may pass through the inclined surface of the locking hook in a state of contacting the inclined surface of the locking hook, thereby allowing the support pipe to be caught by and coupled to the locking hook.

The movement of the support pipe may be restricted by a locking protrusion formed on the locking hook.

The cushion frame may have a lever coupling pipe provided on an inner side thereof and formed to extend in the width direction of the cushion frame, and the lever coupling pipe may be coupled to a locking lever.

The locking lever and the lever coupling pipe may be coupled to each other through an elastic body, and the locking lever may be restored to an original position thereof when external force applied to the locking lever is released.

The seat frame may be hinged to a seatback frame, allowing the seatback frame to rotate relative to the seat frame.

A seat recliner may be provided between the seat frame and the seatback frame, allowing the seatback frame to rotate relative to the seat frame.

In some embodiments, the guide groove is indented in the cushion frame.

Also provided is a vehicle comprising the vehicle seat.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
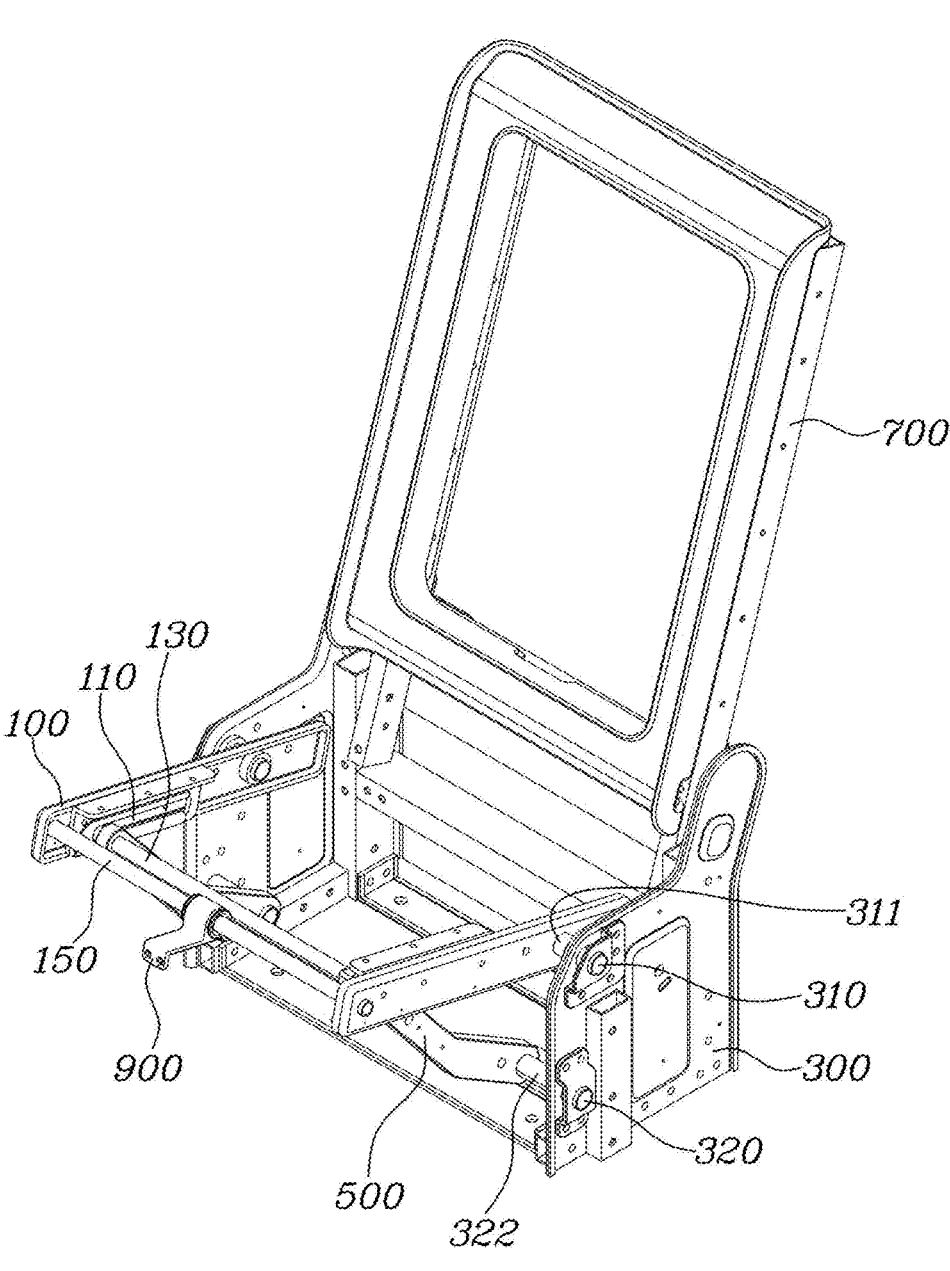
FIG. 1 is a diagram showing a vehicle seat according to an exemplary embodiment of the present disclosure.

Hereinafter, the present disclosure will be described in detail through preferred embodiments thereof with reference to the accompanying drawings. Wherever possible, the same reference numbers will be used throughout the drawings to refer to the same or like parts, and redundant descriptions thereof will be omitted.

In describing the embodiments disclosed herein, when it is determined that a detailed description of publicly known techniques to which the disclosure pertains may obscure the gist of the present disclosure, the detailed description will be omitted. Further, it should be understood that the accompanying drawings are merely illustrated to easily describe the embodiments disclosed in this specification, and therefore, the technical idea disclosed in this specification is not limited by the accompanying drawings. Further, it should be noted that the accompanying drawings include all modifications, equivalents, and substitutes that fall within the spirit and technical scope of the present disclosure.

Meanwhile, in the present disclosure, terms such as "first" and/or "second" may be used to describe various components, but the components are not limited by the terms. The terms are used only for the purpose of distinguishing one component from other components.

In this specification, an expression in a singular form also includes the plural sense, unless clearly specified otherwise in context.

It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Hereinafter, the suffixes "module", "unit", and "part" for components used in the following description are merely provided for facilitation of preparing this specification. Therefore, the suffixes themselves do not have significant meanings or roles.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Figure 2:
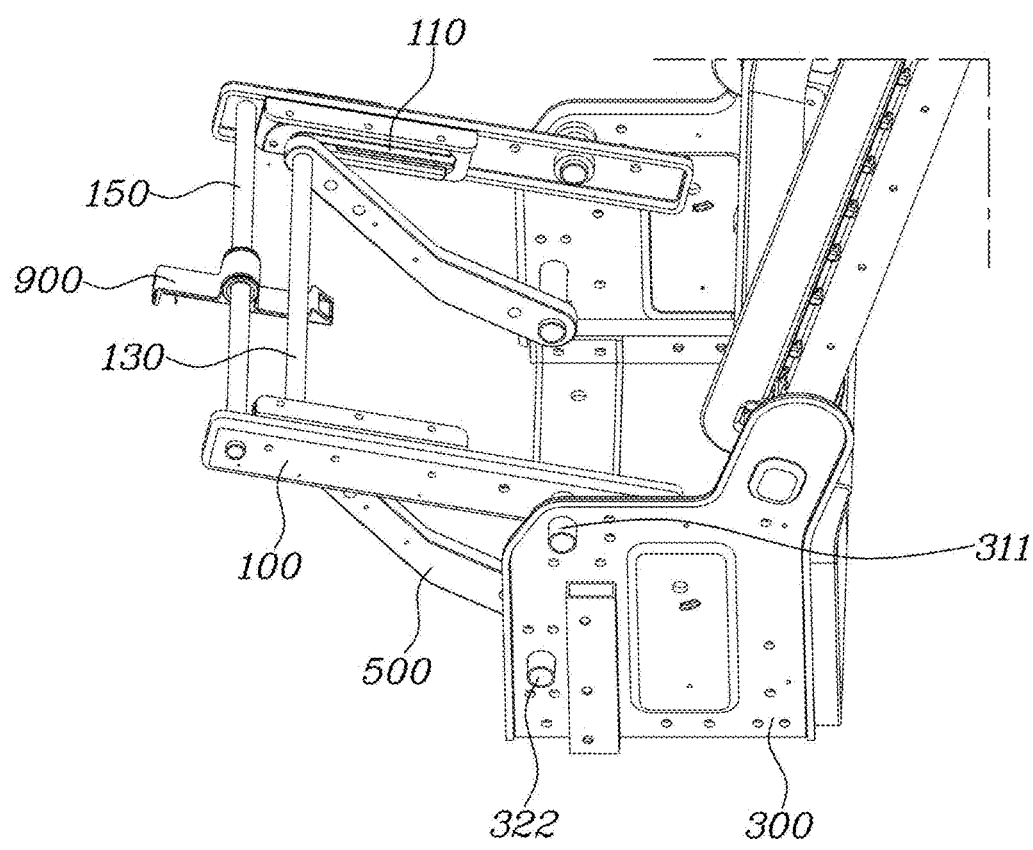
FIG. 2 is a diagram showing a state in which a passenger may be seated on the vehicle seat according to the embodiment of the present disclosure.
Figure 3:
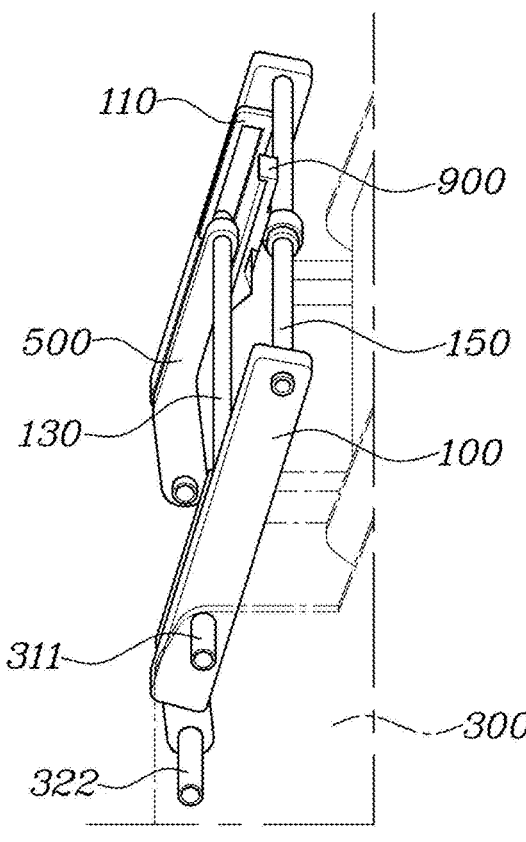
FIG. 3 is a diagram showing a state in which the vehicle seat according to the embodiment of the present disclosure is tipped up.

FIG. 1 is a diagram showing a vehicle seat according to an exemplary embodiment of the present disclosure. FIG. 2 is a diagram showing a state in which a passenger may be seated on the vehicle seat according to the embodiment of the present disclosure. FIG. 3 is a diagram showing a state in which the vehicle seat according to the embodiment of the present disclosure is tipped up.

Referring to FIGS. 1 to 3, the vehicle seat according to the embodiment of the present disclosure includes a cushion frame 100, a seat frame 300, and a support link 500.

The cushion frame 100 forms a seat cushion on which a passenger may seat. The seat cushion may be formed on the cushion frame 100 using an injection method. The cushion frame 100 is coupled to the seat frame 300 so as to be tipped up and accommodated. Additionally, the cushion frame 100 has a guide groove 110 formed therein and coupled to the support link 500 that bears the passenger's load.

The seat frame 300 may be coupled to a floor of a vehicle or a seat cross member provided on the floor, thereby providing a seat configured to allow a passenger to be seated thereon in the interior space of the vehicle. A seatback frame 700 may be coupled to the seat frame 300. A seatback cushion may be formed on the seatback frame 700 to allow the back of a passenger to rest on the seatback cushion.

The support link 500 is basically provided as a structure to support load of a passenger. The support link 500 needs to secure sufficient rigidity so that the passenger may be stably seated on the seat cushion for a long time.

A description will be given as to a relationship between respective components in more detail. The cushion frame 100 is coupled to the seat frame 300 through a hinge method so as to perform a tip-up function. The cushion frame 100 coupled to the seat frame 300 through the hinge method may be rotated relative to the seat frame 300. Further, when the cushion frame 100 is rotated towards the seat frame 300, a tip-up function of the seat may be performed. On the other hand, when the cushion frame 100 is rotated away from the seat frame 300, it enables the seat to function for seating.

Meanwhile, the cushion frame 100 has the guide groove 110 formed in the end thereof. Here, the guide groove 110 is indented in the longitudinal direction and extends in a direction in which the cushion frame 100 is formed. The end of the cushion frame 100 may be processed to form the guide groove 110 directly in the cushion frame 100. Alternatively, a member having the guide groove 110 may be coupled to the end of the cushion frame 100.

One end of the support link 500 connecting the cushion frame 100 to the seat frame 300 is coupled to the seat frame 300, and the other end thereof is coupled to the cushion frame 100. In this case, one end of the support link 500 is coupled to the seat frame 300 through a hinge method so as to be rotatable relative to the seat frame 300, and the other end of the support link 500 is coupled to the guide groove 110 of the cushion frame 100. Here, the other end is coupled to the guide groove 110 so as to be movable therein in response to the rotation of one end of the support link 500.

That is, when external force is applied to rotate the cushion frame 100 towards the seat frame 300, one end of the support link 500 may rotate in conjunction with the cushion frame 100 relative to the seat frame 300. Simultaneously, the other end of the support link 500 may slide within the guide groove 110.

In this manner, when the tip-up function of the seat is performed, the support link 500 that supports load of a passenger is rotated in conjunction with the cushion frame 100. Accordingly, it is possible to effectively provide space in the vehicle interior when the seat is tipped up.

Particularly, when the cushion frame 100 or the support link 500 is rotated relative to the seat frame 300 so as to perform the tip-up function of the seat, the support link 500 may be completely accommodated on the inner side of the cushion frame 100. That is, when the tip-up function of the seat is performed, the support link 500 does not protrude outwards from the seat frame 300 but is accommodated on the inner side of the cushion frame 100. As a result, when the seat is tipped up, space may be effectively provided in the vehicle interior.

Additionally, the seatback frame 700 is rotatably coupled to the seat frame 300. A seat recliner may be provided between the seat frame 300 and the seatback frame 700 so as to perform rotation of the seatback frame 700.

The seatback frame 700 is rotatably coupled to the seat frame 300 to adjust a recline angle of the seatback frame 700, thereby making it possible to adjust a rotational range of the cushion frame 100.

Particularly, the recline angle of the seatback frame 700 may be appropriately adjusted so as to allow the support link 500 to be completely accommodated on the inner side of the cushion frame 100. Accordingly, tipping up the seat effectively frees up space within the vehicle's interior.

In order to completely accommodate the support link 500 on the inner side of the cushion frame 100, the support link 500 is formed to extend in the longitudinal direction. Additionally, the support link 500 may include a bent point instead of a completely straight shape. That is, the support link 500 may be formed to extend in the longitudinal direction from one end, may be bent at one point, and may extend again in the longitudinal direction to form the other end.

By adopting such a bent structure, the support link 500 can achieve greater mechanical rigidity through an increased cross-sectional area, thereby reliably supporting the load of a passenger over an extended period. In addition, the support link 500 and the cushion frame 100 that are connected to the seat frame 300 may have different rotation radii depending on a position at which each of the support link 500 and the cushion frame 100 is connected to the seat frame 300, and a rotation radius of the support link 500 may be larger than a rotation radius of the cushion frame 100. When the support link 500 has a straight shape, rotation of the cushion frame 100 is limited and, as such, the tip-up function of the seat is limited. Therefore, it is desirable for the cushion frame 100 to include a bent portion so as to have a sufficient rotation radius.

Meanwhile, both the cushion frame 100 and the support link 500 are coupled to the seat frame 300. The cushion frame 100 is coupled to a first coupling portion 310 of the seat frame 300 through a hinge method, and the support link 500 is coupled to a second coupling portion 320 of the seat frame 300 through a hinge method.

The first coupling portion 310 having the cushion frame 100 coupled thereto is located higher than the second coupling portion 320 having the support link 500 coupled thereto, thereby securing space for a passenger to sit. Additionally, the support link 500 may be designed with a length sufficient to support the load of a passenger.

However, the positions of the first coupling portion 310 and the second coupling portion 320 are not limited thereto, and the second coupling portion 320 may be located higher than the first coupling portion 310. However, depending on the positions of the first coupling portion 310 and the second coupling portion 320, the coupled position of the support link 500, the length of the support link 500, the bent direction of the support link 500, and the like may vary, which may be appropriately changed in design by a person skilled in the art.

More specifically, the cushion frame 100 and the seat frame 300 are coupled to each other by a first hinge pipe 311. Here, any one of the cushion frame 100 and the seat frame 300 may be fixedly connected to the first hinge pipe 311 so that the cushion frame 100 is rotatable relative to the seat frame 300.

The support link 500 and the seat frame 300 are coupled to each other by a second hinge pipe 322. In the same manner as described above, any one of the support link 500 and the seat frame 300 may be fixedly connected to the second hinge pipe 322 so that the support link 500 is rotatable relative to the seat frame 300.

For example, the first hinge pipe 311 and the second hinge pipe 322 are fixedly connected to one end of the cushion frame 100 and one end of the support link 500, respectively, and are rotatably connected thereto in the seat frame 300, thereby allowing the cushion frame 100 and the support link 500 to be rotated relative to the seat frame 300.

Meanwhile, the guide groove 110 is formed in each of a pair of opposite ends of the cushion frame 100. The cushion frame 100 may be formed in a square shape having a space formed on the inner side thereof. Here, the guide groove 110 may be formed in each of the ends of a pair of frames each extending in the longitudinal direction. As described above, the guide groove 110 may be formed directly at the pair of ends of the cushion frame 100, or a member having the guide groove 110 may be coupled to the pair of ends of the cushion frame 100. The guide groove 110 may have a straight or gently curved shape. Meanwhile, two support links 500 are provided in a state of facing each other, and the other end of each of the support links 500 may be coupled to a corresponding one of the guide grooves 110. The support link 500 has a protrusion formed at the other end thereof and configured to be fitted into the guide groove, thereby allowing the support link 500 to be directly coupled to the guide groove 110. Alternatively, the support link 500 may be indirectly coupled to the guide groove 110 by being coupled to another component directly coupled to the guide groove 110.

A description will be given as to an exemplary embodiment in which the support link 500 is indirectly coupled to the guide groove 110. A support pipe 130 extending in the width direction of the cushion frame 100 may be coupled to the guide groove 110 of the cushion frame 100, and the support pipe 130 may be coupled to the guide groove 110 so as to be movable therein. In addition, the support link 500 has a space provided at the other end thereof and configured to allow the end of the support pipe 130 to be inserted thereinto, and the support link 500 is coupled to the support pipe 130 through the space, thereby allowing the support link 500 to be indirectly coupled to the guide groove 110.

In this manner, according to a coupling structure among the cushion frame, the support pipe, and the support link, when external force is applied to the cushion frame 100 and the cushion frame 100 is rotated relative to the seat frame 300, the support link 500 may be also rotated relative to the seat frame 300, and the support pipe 130 connected to the support link 500 may slide within the guide groove 110 by rotation of the support link 500.

When the cushion frame 100 moves toward the seat frame 300, the support pipe 130 may be also moved within guide groove 110 in a direction approaching the seat frame 300. When the cushion frame 100 is moved away from the seat frame 300, the support pipe 130 may be also moved within the guide groove 110 in a direction away from the seat frame 300.

Meanwhile, the seat according to the present disclosure may be provided with a locking lever 900 adopted to prevent any movement of the support pipe 130 so as to prevent unintended rotation of the cushion frame 100. The locking lever 900 is caught by and coupled to the support pipe 130, thereby preventing any movement of the support pipe 130.

Figure 4:
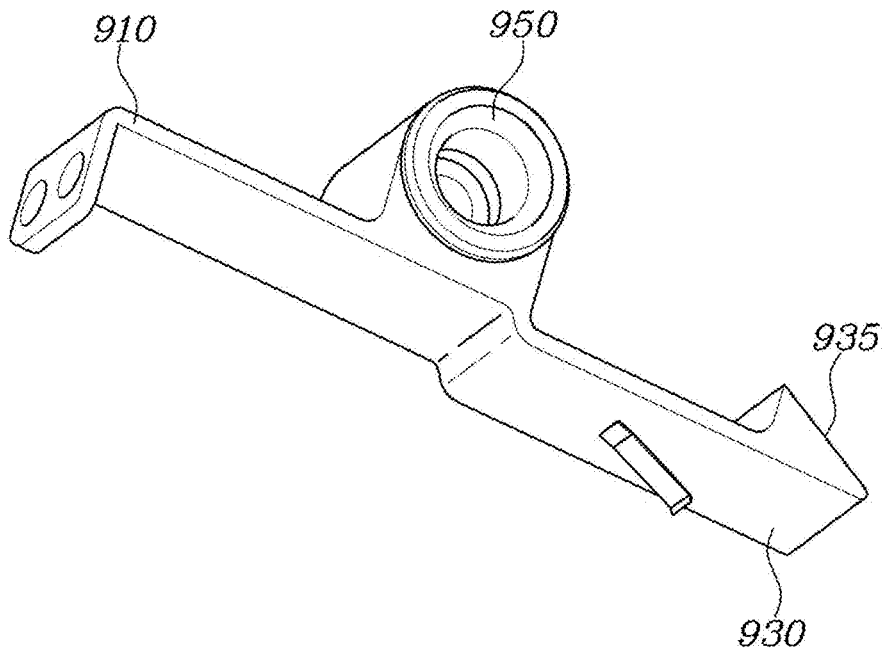
FIG. 4 is a diagram showing a locking lever.
Figure 5:
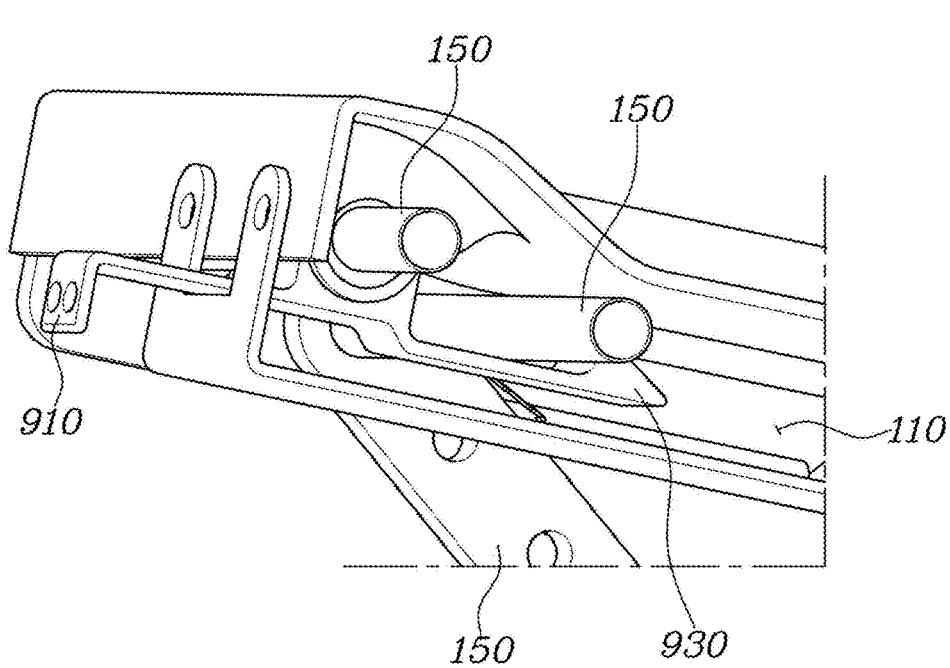
FIG. 5 is a diagram showing a state in which the locking lever is caught by and coupled to a support pipe.

FIG. 4 is a diagram showing the locking lever, and FIG. 5 is a diagram showing a state in which the locking lever is caught by and coupled to the support pipe. An operation of the locking lever will be described with reference to FIGS. 4 and 5.

The locking lever 900 may have a handle portion 910 provided at one end thereof, the handle portion being formed to protrude outwards from the cushion frame 100 so as to apply external force thereto, and a locking hook 930 provided at the other end thereof, the locking hook being caught by and coupled to the support pipe 130 so as to prevent any movement of the support pipe 130.

In addition, the cushion frame 100 has a lever coupling pipe 150 provided on the inner side thereof and formed to extend in the width direction of the cushion frame 100, and the locking lever 900 may be coupled to the lever coupling pipe 150. The central portion of the locking lever 900 is coupled to the lever coupling pipe 150, with an elastic body 950 facilitating the connection between them.

Specifically, a description will be given as to an operation process of the locking lever 900 with reference to FIGS. 6 to 10, in which the operation process is performed to put a seat in a seatable state into a tip-up state.

Figure 6:
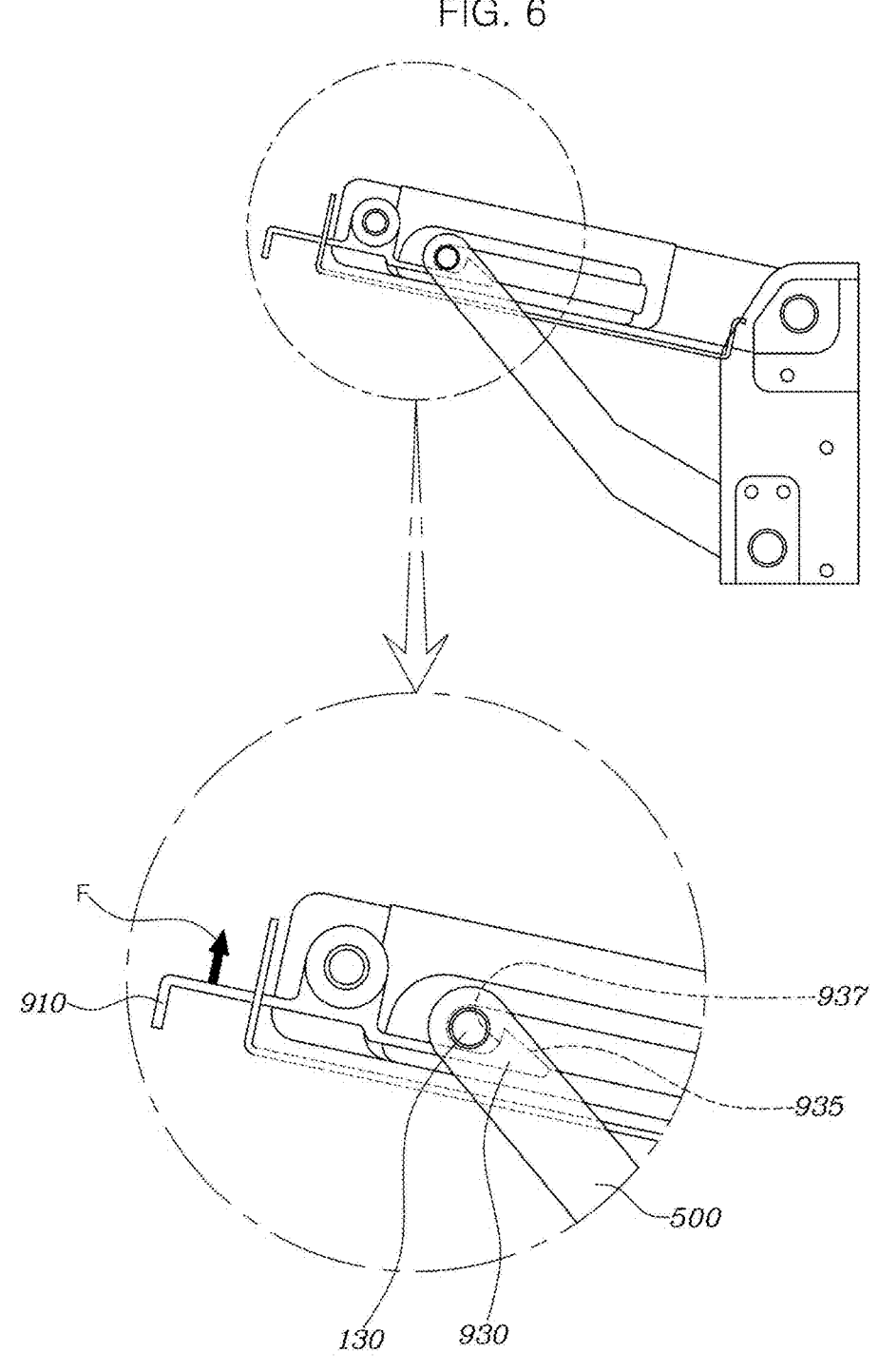
FIG. 6, FIG. 7, FIG. 8, FIG. 9, and FIG. 10 are diagrams showing a series of processes to describe an operation of the locking lever.
Figure 7:
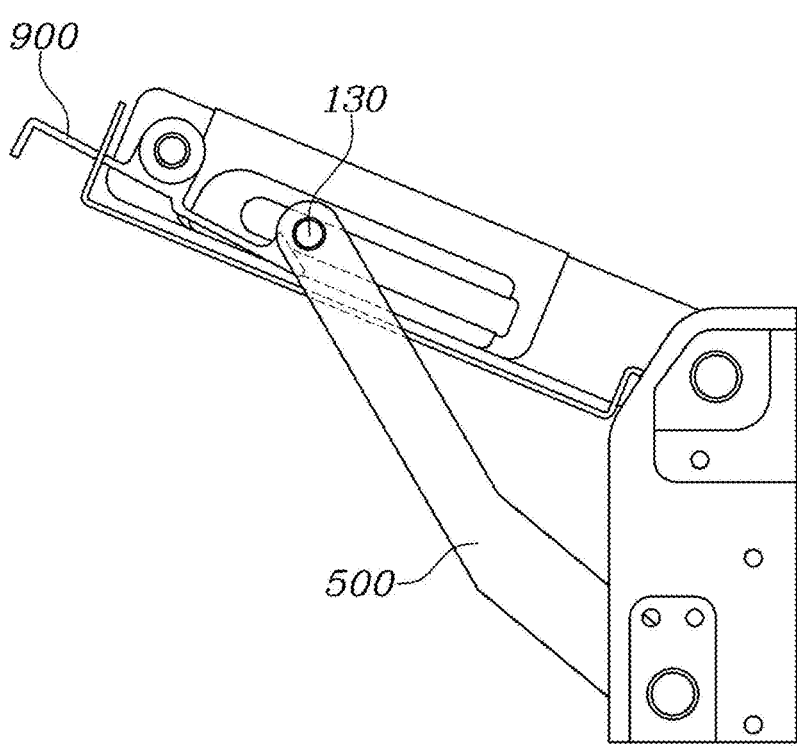

First, referring to FIG. 6, movement of the support pipe 130 is restricted by a locking protrusion 937 formed on the locking hook 930. In this case, external force F is applied to the handle portion 910 of the locking lever 900 to tip up the seat. That is, when the external force F is applied thereto in the direction of lifting the handle portion 910, the locking hook 930, which is the other end of the locking lever 900, is released from the support pipe 130, as shown in FIG. 7.

When coupling between the support pipe 130 and the locking lever 900 is released, the support pipe 130 becomes movable. As a result, the cushion frame 100 also becomes rotatable, enabling the seat's tip-up function through a series of processes depicted in FIGS. 7 to 10.

Conversely, a description will be given as to an operation process of the locking lever 900, in which the operation process is performed to put a seat in a tip-up state into a seatable state. A series of processes of putting the seat in the tip-up state into the seatable state is performed in the reverse order of the above-described tip-up processes.

Figure 8:
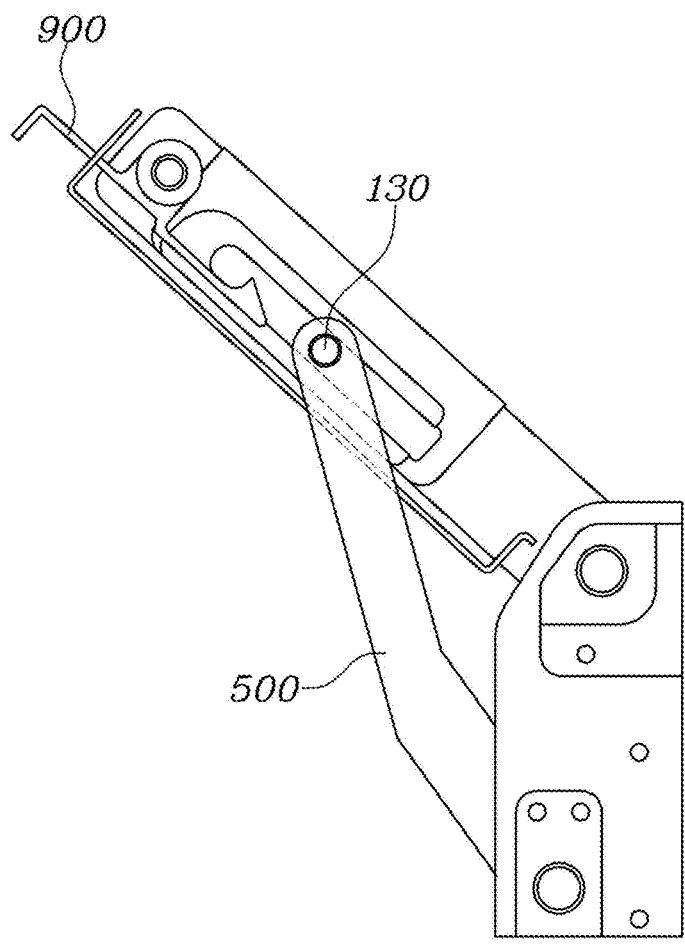
Figure 9:
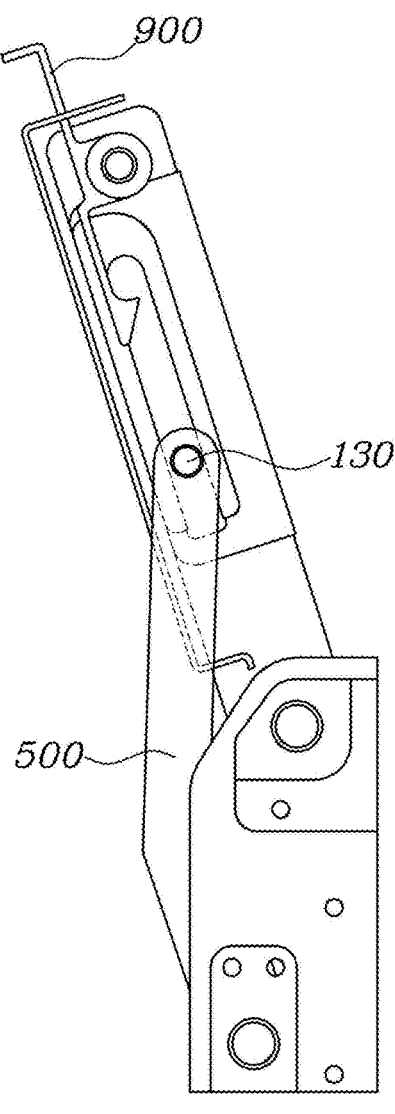
Figure 10:
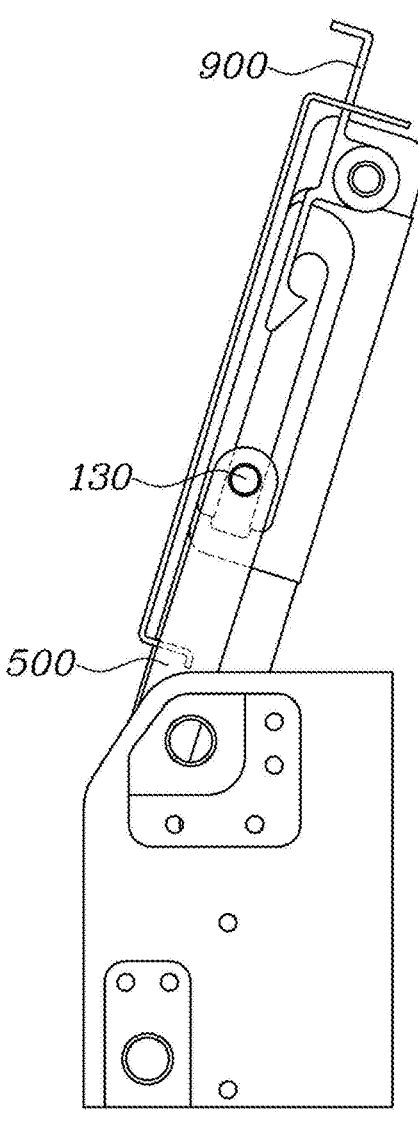

First, referring to FIG. 10, external force is applied to the cushion frame 100 in a direction in which the cushion frame 100 is pulled downwards. When the cushion frame 100 is pulled downwards, the support pipe 130 is also moved in response to the rotation of the cushion frame 100. The process is performed as shown in FIGS. 7 to 9.

Referring to FIG. 7, the support pipe 130 gradually approaches the locking hook 930 of the locking lever 900, and the support pipe is in contact with an inclined surface 935 formed at the end of the locking hook 930. Here, the support pipe passes through the inclined surface 935 in a state of contacting the inclined surface 935, and finally, as shown in FIG. 6, the support pipe 130 is caught by the locking protrusion 937 of the locking hook 930, thereby allowing the support pipe 130 to be caught by and coupled to the locking hook 930.

Meanwhile, the locking lever 900 and the lever coupling pipe 150 may be coupled to each other through the elastic body 950, and the elastic body 950 may be a torsion spring. When external force applied to the handle portion 910 of the locking lever 900 or the locking hook 930 of the locking lever 900 is released, the elastic body 950 may restore the locking lever 900 to an original position thereof.

Specifically, even if external force is unintentionally and momentarily applied to the handle portion 910 of the locking lever 900, the locking lever 900 is restored by the elastic body 950, and the locking hook 930 is coupled to the support pipe 130, thereby preventing any movement of the support pipe 130.

In addition, the support pipe 130 is in contact with the inclined surface 935 of the locking hook 930 and continuously applies external force to the locking lever 900. Here, when the support pipe 130 engages and locks with the locking protrusion 937 of the locking hook 930, and the external force exerted on the locking hook 930 by the support pipe 130 is released, the locking lever 900 returns to its original position. This prevents any further rotation of the cushion frame 100.

As is apparent from the above description, the present disclosure provides a vehicle seat including a support link configured to withstand, when a passenger is seated on the seat, load of the passenger. The support link allows the passenger to be stably seated on the seat. Further, when the seat is tipped up, the support link is accommodated on the inner side of a cushion frame, thereby making it possible to effectively secure space in the vehicle interior.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A vehicle seat comprising:
   a cushion frame configured to seat a passenger and comprising a substantially linear guide groove formed in an end thereof and extended in a longitudinal direction of the cushion frame;
   a seat frame, wherein the cushion frame is hinged to the seat frame, allowing the cushion frame to rotate; and
   a support link comprising one end coupled to the seat frame to enable rotation, and the other end coupled to the guide groove in the cushion frame, allowing movement within the guide groove when the one end rotates.

2. The vehicle seat of claim 1, wherein the support link is accommodated on an inner side of the cushion frame when the cushion frame or the support link rotates toward the seat frame.

3. The vehicle seat of claim 1, wherein the support link extends in a longitudinal direction thereof and comprises a bent point.

4. The vehicle seat of claim 1, wherein the cushion frame is hinged to a first coupling portion of the seat frame, and the support link is hinged to a second coupling portion of the seat frame, and wherein the first coupling portion is located higher than the second coupling portion.

5. The vehicle seat of claim 4, wherein the first hinge pipe and the second hinge pipe are fixedly connected to one end of the cushion frame and one end of the support link, respectively, and are rotatably connected thereto in the seat frame.

6. The vehicle seat of claim 1, wherein the cushion frame and the seat frame are coupled to each other through a first hinge pipe, and the support link and the seat frame are coupled to each other through a second hinge pipe.

7. The vehicle seat of claim 1, wherein the cushion frame comprises a pair of opposite ends each comprising the guide groove formed therein, and a pair of the support links facing each other is provided to allow the other end of each support link to be coupled to the guide groove.

8. The vehicle seat of claim 1, wherein the cushion frame comprises a pair of opposite ends each comprising the guide groove formed therein, each guide groove comprises a support pipe movably coupled thereto and formed to extend in a width direction of the cushion frame, and a pair of support links facing each other is provided to allow the other end of each support link to be coupled to the support pipe.

9. The vehicle seat of claim 8, wherein the support pipe moves in the guide groove in response to rotation of the cushion frame.

10. The vehicle seat of claim 8, wherein the cushion frame comprises a locking lever provided on an inner side thereof that engages with and is coupled to the support pipe to prevent movement of the support pipe.

11. The vehicle seat of claim 10, wherein the locking lever comprises a handle portion provided at one end thereof, the handle portion being formed to protrude outwards from the cushion frame to apply external force thereto, and a locking hook provided at another end thereof that engages with and is coupled to the support pipe to prevent the movement of the support pipe.

12. The vehicle seat of claim 11, wherein coupling between the locking hook and the support pipe is released when the external force is applied to the handle portion, thereby allowing the support pipe to be movable.

13. The vehicle seat of claim 10, wherein the locking hook comprises an inclined surface formed at an end thereof, and when the cushion frame rotates, the support pipe passes through the inclined surface of the locking hook in a state of contacting the inclined surface of the locking hook, thereby allowing the support pipe to be caught by and coupled to the locking hook.

14. The vehicle seat of claim 10, wherein movement of the support pipe is restricted by a locking protrusion formed on the locking hook.

15. The vehicle seat of claim 8, wherein the cushion frame comprises a lever coupling pipe provided on an inner side thereof and formed to extend in the width direction of the cushion frame, wherein the lever coupling pipe is coupled to a locking lever.

16. The vehicle seat of claim 15, wherein the locking lever and the lever coupling pipe are coupled to each other through an elastic body, and the locking lever is restored to an original position thereof when external force applied to the locking lever is released.

17. The vehicle seat of claim 1, wherein the seat frame is hinged to a seatback frame, allowing the seatback frame to rotate relative to the seat frame.

18. The vehicle seat of claim 17, wherein a seat recliner is provided between the seat frame and the seatback frame, allowing the seatback frame to rotate relative to the seat frame.

19. A vehicle comprising the vehicle seat of claim 1.

* * * * *